(12) United States Patent
Blais et al.

(10) Patent No.: US 6,946,288 B2
(45) Date of Patent: Sep. 20, 2005

(54) VENTILATION SYSTEM FOR AN ENCLOSURE IN WHICH PEOPLE LIVE AND A METHOD THEREOF

(75) Inventors: Jean-Sébastien Blais, Charlesbourg (CA); Jean Ruel, Québec (CA); Frédéric Dutil, Québec (CA)

(73) Assignee: CO2 Solution, Inc., Quebec (CA)

( * ) Notice: Subject to any disclaimer, the term of this patent is extended or adjusted under 35 U.S.C. 154(b) by 277 days.

(21) Appl. No.: 10/160,313

(22) Filed: May 31, 2002

(65) Prior Publication Data

US 2003/0224504 A1 Dec. 4, 2003

(51) Int. Cl.[7] .............................................. C12M 1/40
(52) U.S. Cl. .............................. 435/299.1; 435/300.1; 435/266; 422/122
(58) Field of Search .............................. 435/266, 286.6, 435/299.1, 300.1; 55/385.1, 385.2, 385.4; 423/220, 230; 422/122; 128/205.28; 454/228, 229, 234

(56) References Cited

U.S. PATENT DOCUMENTS

| | | | |
|---|---|---|---|
| 4,046,529 A | 9/1977 | Fletcher et al. | ................ 55/179 |
| 5,005,787 A | 4/1991 | Cullingford | ................ 244/163 |
| 5,389,120 A * | 2/1995 | Sewell et al. | ................ 96/233 |
| 6,143,556 A | 11/2000 | Trachtenberg | ........... 435/289.1 |
| 6,364,938 B1 | 4/2002 | Birbara et al. | ................ 95/139 |

FOREIGN PATENT DOCUMENTS

| | | | |
|---|---|---|---|
| CA | 2291785 | 12/1998 | |
| JP | 06316297 A * | 11/1994 | ........... B64D/13/00 |

* cited by examiner

Primary Examiner—William H. Beisner
(74) Attorney, Agent, or Firm—Myers Bigel Sibley & Sajovec

(57) ABSTRACT

A ventilation system is disclosed for an enclosure in which people live. The ventilation system comprises a first ducting means for ducting fresh air from outside to inside the enclosure and a second ducting means for ducting stale air. The second ducting means comprises a stale air inlet for receiving stale air containing carbon dioxide from inside the enclosure and an exhaust manifold having a first vent to exhaust air outside the enclosure and a second vent in fluid communication with the first ducting means to return clean air into the first ducting means. The ventilation system is further characterised in that it comprises catalysing means for catalysing hydration of carbon dioxide contained in at least a portion of the stale air into a solution of carbonate ions and hydrogen ions, and thereby removing carbon dioxide from said portion of the stale air and obtaining clean air. Evacuating means are also provided for evacuating the solution out of the ventilation system.

15 Claims, 3 Drawing Sheets

VENTILATION SYSTEM FOR AN ENCLOSURE IN WHICH PEOPLE LIVE AND A METHOD THEREOF

FIELD OF THE INVENTION

This invention relates generally to the field of ventilation system for building. More specifically, it concerns a ventilation system for an enclosure such as an airtight building in which people live, adapted to recycle and reduce the carbon dioxide content of stale air coming from inside the enclosure.

BACKGROUND OF THE INVENTION

During respiration of live beings significant quantities of carbon dioxide is released. This $CO_2$ can have asphyxiating effect when present in high concentrations.

Management of the harmful gases present in a variety of concentrations is traditionally carried out by elimination of a volume of returned air and the intake of an equivalent amount of fresh air from the exterior. Fresh air from the exterior requires several treatments of high power consumption treatment in order to gain similar properties to the volume of rejected air which have undergone many processes such as: heated/cooled, humidified/dehumidified.

Closed buildings or closed environments are installations wherein equipment and environmental control for occupants is assured only by a ventilation system. The efficiency of the ventilation system depends on the constant adjustment of airflow to different zones of the building and it is not possible to open windows or doors leading to the exterior of the building.

The maintenance of air quality to ensure human respiration and activity can only be assured by the elimination of carbon dioxide, dust and other noxious gases. Symptoms due to the exposure to high concentrations of carbon dioxide are well known and thus affirm a need for a proper ventilation system designed for closed environments. As such, the aerospace industry has previously proposed several biological and physico-chemical devices to resolve these problems.

One method of controlling carbon dioxide is to use a bio-regenerative system involving green plants known for their photosynthetic capacities. Such a method consists of circulating into a greenhouse, or a system including plants, stale air produced by human respiration, to convert the carbon dioxide into oxygen. This method permits to affix atom of carbons from carbon dioxide to generate an additional mass of green plants able to treat additional volumes of gas. Such a system is described in U.S. Pat. No. 5,005,787. Limitations of such a method include the amount of space required for a greenhouse as well as the amount of energy needed to stimulate the growth of green plants. Furthermore, the active element of this system, green plants, requires special care in order to avoid degradation and/or death.

Another method consists of chemically eliminating carbon dioxide by using lithium hydroxide filters. These filters are used for the environment control systems (ECS) of spacecraft, space suits and submarines. The elimination of carbon dioxide with this method involves two reactions.

The first reaction consists of forming lithium hydroxide monohydrate from lithium hydroxide and water.

The second reaction implies the reaction between lithium hydroxide monohydrate and carbon dioxide to form lithium carbonate and water.

The reaction between carbon dioxide and lithium hydroxide is spontaneous only when in contact with humid air.

Generally, the use of such systems is based on canisters, which are similar to filters, and which contain a limited quantity of solid lithium hydroxide needed to treat a fixed volume of carbon dioxide ($CO_2$). The efficiency of such a system is not questioned, however the problematic of the short life span of these canisters limits the volume of air capable of being treated.

Other systems have also been developed around $CO_2$ sorption with solid phase amines. In such systems, primary and secondary alkanolamines react with dissolved $CO_2$ in a two step sequence. The first sequence involves the formation of a zwiterrion. In a second sequence the zwiterrion transfers a proton to an unionised amine, forming the corresponding carbamate.

$$R_1R_2NH + CO_2(aq) \rightarrow R_1R_2NH^+CO_2^-$$

$$R_1R_2NH + R_1R_2NH^+CO_2^- \rightarrow R_1R_2NH^+ + R_1R_2NCO_2^-$$

The reaction of tertiary amines with $CO_2$ proceeds by the formation of a protonated amine and a bicarbonate anion.

$$R_1R_2R_3N + H_2O + CO_2(aq) \rightarrow R_1R_2R_3NH^+ + HCO_3^-$$

Three commonly used alkanolamine $CO_2$ sorbents are monoethanolamine (MEA), diethanolamine (DEA), and methyldiethanolamine (MDEA). The solid phase amine $CO_2$ sorbents work by analogous reactions between airborne $CO_2$, water vapour, and the amine bearing the polymer functional groups (U.S. Pat. No. 6,364,938). Some $CO_2$ removal systems, used in aerospace, are based on Amberlite XAD-7 beds with a polyethyleneimine coat (U.S. Pat. No. 4,046,529).

These systems, based on the principle of elimination, contain two chambers working in parallel to treat air. Each of these two chambers works for definite periods before being regenerated. In other words, as one chamber is being used, the second chamber is in a regenerating mode. A problem associated with the two chamber operating mode is the high consumption of energy since it operates in a vacuum (closed environment). In certain cases, these systems require the input of energy in the form of heat to be operable. This is a major drawback to the use of such a system in a terrestrial environment, and particularly for an enclosed building.

Another chemical method of eliminating carbon dioxide is by using metal oxides. This method has vast applications including treating cryogenic gases and autonomous mobile space units. The most recent type of air treatment system used in spatial mobile units is based on silver oxide. The reaction of carbon dioxide with silver oxide, performed in the presence of water, is carried out to produce silver carbonate.

$$Ag_2O + CO_2 \rightarrow Ag_2CO_3$$

The reaction can also be reversible at high temperatures:

$$Ag_2CO_3 \rightarrow Ag_2O + CO_2 (220° C.)$$

The reversibility of such a process is important when re-using the active element of the system. However, upon several regenerations, the structure has a tendency to breakdown.

Another carbon dioxide elimination technology of physical type consists of using a molecular sieve in conjunction with porous materials to capture carbon dioxide. Molecular sieves, which are made of zeolites composed of silica and alumina, exhibit a high porosity and a regular pore dimension due to their crystalline structure. In such case, carbon dioxide sets in the pores of the crystal lattice and remains captive until the molecular sieve is regenerated. These molecular sieves are equipped with a device adapted to pre-treat the air by means of a similar molecular sieve capable of adsorbing the water molecules. This device is essential since the presence of water vapour inhibits $CO_2$ absorption in this type of process. The sensitivity of the process to humidity present in air as well as the need to thermally regenerate or vacuum the sieve constitute two significant drawbacks if it were to be applied in a ventilation system of a building.

Also known in the prior art, there is CA 2291785 in the name of the applicant which discloses generally the use of carbonic anhydrase in a packed tower-type bioreactor. There is also U.S. Pat. No. 6,143,556 which also generally discloses the use of the enzyme, carbonic anhydrase.

Thus there is still presently a need for a ventilation system that would efficiently and easily allows carbon dioxide contained in recycled stale air to be greatly reduced or even completely removed from the air.

SUMMARY OF THE INVENTION

An object of the present invention is to provide a ventilation system and a method thereof that satisfy the above-mentioned need.

In accordance with the present invention, that object is achieved with a ventilation system for an enclosure in which people live. The ventilation system comprises a first ducting means for ducting fresh air from outside to inside the enclosure and a second ducting means for ducting stale air. The second ducting means comprises a stale air inlet for receiving stale air containing carbon dioxide from inside the enclosure and an exhaust manifold having a first vent to exhaust air outside the enclosure and a second vent in fluid communication with the first ducting means to return clean air into the first ducting means. The ventilation system further comprises catalysing means for catalysing hydration of carbon dioxide contained in at least a portion of the stale air into a solution of carbonate ions and hydrogen ions, and thereby removing carbon dioxide from the portion of the stale air and obtaining clean air. The catalysing means is located in the second ducting means upstream from the second vent. The ventilation system also comprises evacuating means for evacuating the solution out of the ventilation system.

It is worth mentioning that throughout the present description the use of the articles "a" or "an" is not limited to a single but rather means "at least one"), or "one or more". For example the ducts may be provided with one or more air inlet or vent, and the ventilation system may comprises one or more first and second ducts. Also, the reference to "a" bioreactor below means "at least one" bioreactor.

The catalysing means can be located at different places upstream form the second vent of the exhaust manifold. For example, it could be located completely upstream from the exhaust manifold. In the case where the stale air inlet comprises a plurality of inlet ducts, it could be located inside each of the inlet ducts. It could also be located inside a return or recirculation duct of the exhaust manifold preceding the second vent.

Preferably, the catalysing means comprises an enzyme capable of catalysing the hydration of carbon dioxide. More preferably, the enzyme is carbonic anhydrase or an analog thereof.

In accordance with a preferred aspect of the invention, the catalysing means comprises a bioreactor comprising:

air inlet means for receiving the at least a portion of the stale air;

dissolving means for dissolving the carbon dioxide contained in the at least a portion of the stale air into an aqueous liquid;

an enzymatic reaction chamber filled with carbonic anhydrase or an analog thereof to catalyse the hydration of said dissolved $CO_2$ into said solution bicarbonate ions and hydrogen ions; and a liquid outlet in fluid communication with the enzymatic reaction chamber for discharging the solution of bicarbonate ions and hydrogen ions out from the bioreactor; and air outlet means for exhausting clean air out from the bioreactor into the second ducting means.

In this case, the evacuating means preferably comprises a pipe having an inlet connected to the liquid outlet of the bioreactor and an outlet located outside the ventilation system.

As can be appreciated, by making use of a bioreactor as defined above in a ventilation system it is possible to withdraw a desired quantity of $CO_2$ and, consequently, maintain a high quality of air as prescribed by the standards in force.

It is thus an object of this preferred embodiment of the invention to remove carbon dioxide from the air by using an enzymatic process of a bioreactor. This solution also has the advantage of reducing the power consumption of ventilation system and minimising the regeneration mode associated to both pre- and post-processing of air.

It is also an object of this preferred embodiment to use a bioreactor involving a chemical reaction catalysed by an enzyme, anhydrase carbonic, to withdraw an amount of carbon dioxide from a ventilation system (air duct) intended for breathing.

Preferably the enzyme is immobilised on a solid polymer support and act specifically on $CO_2$ in an aqueous medium without energetic or nutriment loss needed to maintain the activity of the bioreactor. The invention can also be adapted a standard ventilation system of building and a device intended for the removal of $CO_2$ without altering any systems and/or traditional techniques already in place in industry. The use of such a device also makes it possible to decrease the volume exhausted air (towards the exterior) and save energy necessary to treat and replace air.

The bioreactor comprises an upstream side opposite a downstream side. The air inlet means is located on the upstream side and the air outlet means is located on the downstream side whereby the air inside the bioreactor is flowing from the upstream side towards the downstream side along a flowing direction. Preferably, the air outlet means comprises separating means for separating any liquid in suspension from the clean air. More preferably, the separating means comprises a series of baffle walls extending in a direction transversal to the flowing direction to force the clean air to zigzag out from the bioreactor.

In one preferred embodiment of the invention, the dissolving means comprises a liquid inlet located in a top portion of the bioreactor for receiving an aqueous liquid; and a dissolution chamber located between the air inlet means and air outlet means, and over the enzymatic reaction chamber. The dissolution chamber is in fluid communication with the air inlet means and the air outlet means whereby the at least a portion of stale air is allowed to flow across the dissolution chamber. In this case, the dissolution chamber further comprises sprinklers in a top portion of the dissolution chamber and in fluid communication with the liquid inlet of the bioreactor to sprinkle aqueous liquid onto the stale air flowing across the dissolution chamber and dissolved the $CO_2$ contained therein; and a liquid outlet in a bottom portion of the dissolution chamber and in fluid communication with the enzymatic reaction chamber whereby an aqueous liquid containing $CO_2$ is supplied by gravity to a liquid inlet of the enzymatic reaction chamber. The liquid outlet of the dissolution chamber is at a predetermined distance from the liquid inlet of the enzymatic reaction chamber chosen so as to prevent the dissolved carbon dioxide contained in said aqueous liquid to return to a gaseous phase. This distance is preferably one foot or less. In this preferred embodiment, the enzymes filling the enzymatic reaction chamber are preferably submerged. They could be entrapped or immobilised on a solid support.

In this preferred embodiment, the dissolving means may alternatively or additionally comprise a sprinkler upstream from the dissolution chamber and in fluid communication with the liquid inlet of the bioreactor for sprinkling an aqueous liquid on the at least a portion of stale air prior it enters the dissolution chamber. Also preferably, the dissolution chamber is filled with packing to enhance the dissolution of the carbon dioxide.

In a second preferred embodiment of the invention, the enzymatic reaction chamber is located in between the air inlet means and the air outlet means of the bioreactor and is in fluid communication with the air inlet means and the air outlet means whereby the at least a portion of stale air is allowed to flow across the enzymatic reaction chamber. In this case, the dissolving means comprises a liquid inlet located in a top portion of the bioreactor for receiving an aqueous liquid and a sprinkler in a top portion of the enzymatic reaction chamber and in fluid communication with the liquid inlet of the bioreactor to sprinkle aqueous liquid onto the stale air flowing across the enzymatic reaction chamber and dissolve the $CO_2$ contained therein.

In this case, the dissolving means may alternatively or additionally comprise a sprinkler upstream the enzymatic reaction chamber and in fluid communication with the liquid inlet of the bioreactor for sprinkling aqueous liquid on the stale air prior it enters the enzymatic reaction chamber.

Also preferably in this case, the enzymes filling the enzymatic reaction chamber are immobilised on a solid support that is preferably selected from at least one element of the group consisting of packing, plates and netting of mesh. The solid support may advantageously be contained in an interchangeable cartridge.

The invention also proposes a method for ventilating an enclosure in which people live, the method comprising the steps of:

ducting fresh air from outside to inside the enclosure;

ducting stale air containing carbon dioxide from inside the enclosure to outside the enclosure;

recycling a portion of the stale air containing carbon dioxide from inside the enclosure;

reducing the carbon dioxide content of the portion of stale air and obtaining clean air; and exhausting the clean air inside the enclosure; wherein the step of reducing the carbon dioxide comprises the step of:

catalysing the hydration of carbon dioxide contained in said portion of stale air into a solution of carbonate ions and hydrogen ions.

Preferably, the step of hydration is performed in the presence of an enzyme capable of catalysing the hydration of dissolved $CO_2$ into hydrogen ions and bicarbonate ions. More preferably, the enzyme is carbonic anhydrase or an analog thereof.

BRIEF DESCRIPTION OF THE DRAWINGS

Other objects and advantages of the invention will become apparent upon reading the detailed description and upon referring to the drawings in which.

While the invention will be described in conjunction with example embodiments, it will be understood that it is not intended to limit the scope of the invention to such embodiments. On the contrary, it is intended to cover all alternatives, modifications and equivalents as may be included as defined by the appended claims.

DESCRIPTION OF PREFERRED EMBODIMENTS

Figure 1:
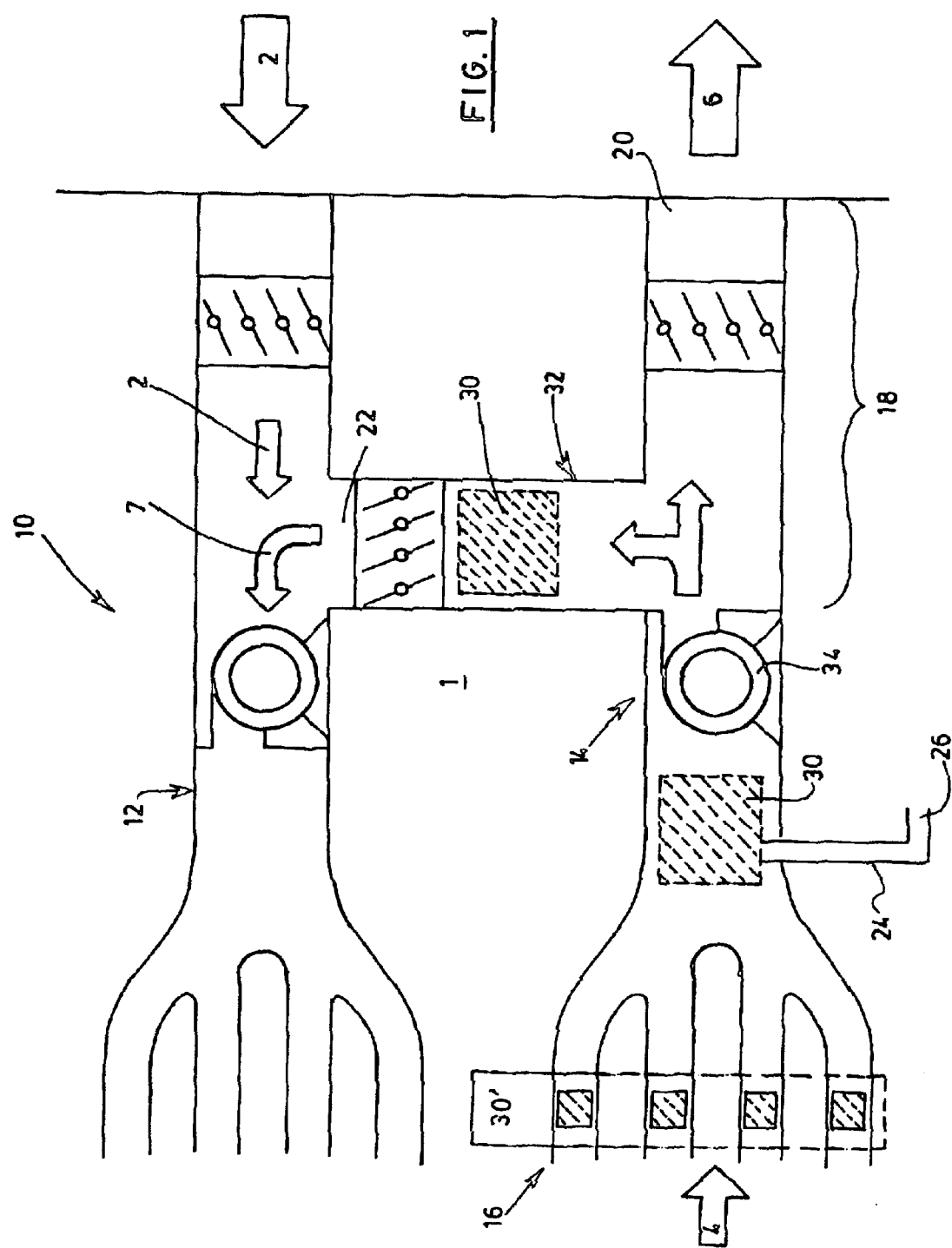
FIG. 1 is a schematic view of a ventilation system according to the invention showing different possible locations for the bioreactor within the ducts of the systems.

A ventilation system (10) according to the invention is particularly useful for use in an airtight building (1) or an enclosure in which people live. Referring to FIG. 1, in a preferred realisation of the invention, the ventilation system (10) comprises a first duct system (12) for ducting fresh air (2) from outside to inside the building (1) and a second duct system (14) for ducting stale air (4). The second duct system (14) comprises a stale air inlet (16) for receiving stale air containing carbon dioxide from inside the building (1) and an exhaust manifold (18) having a first vent (20) to exhaust air (6) outside the building (1) and a second vent (22) in fluid communication with the first air duct system (12) to return clean air (7) into the first duct system (12).

Figure 2:
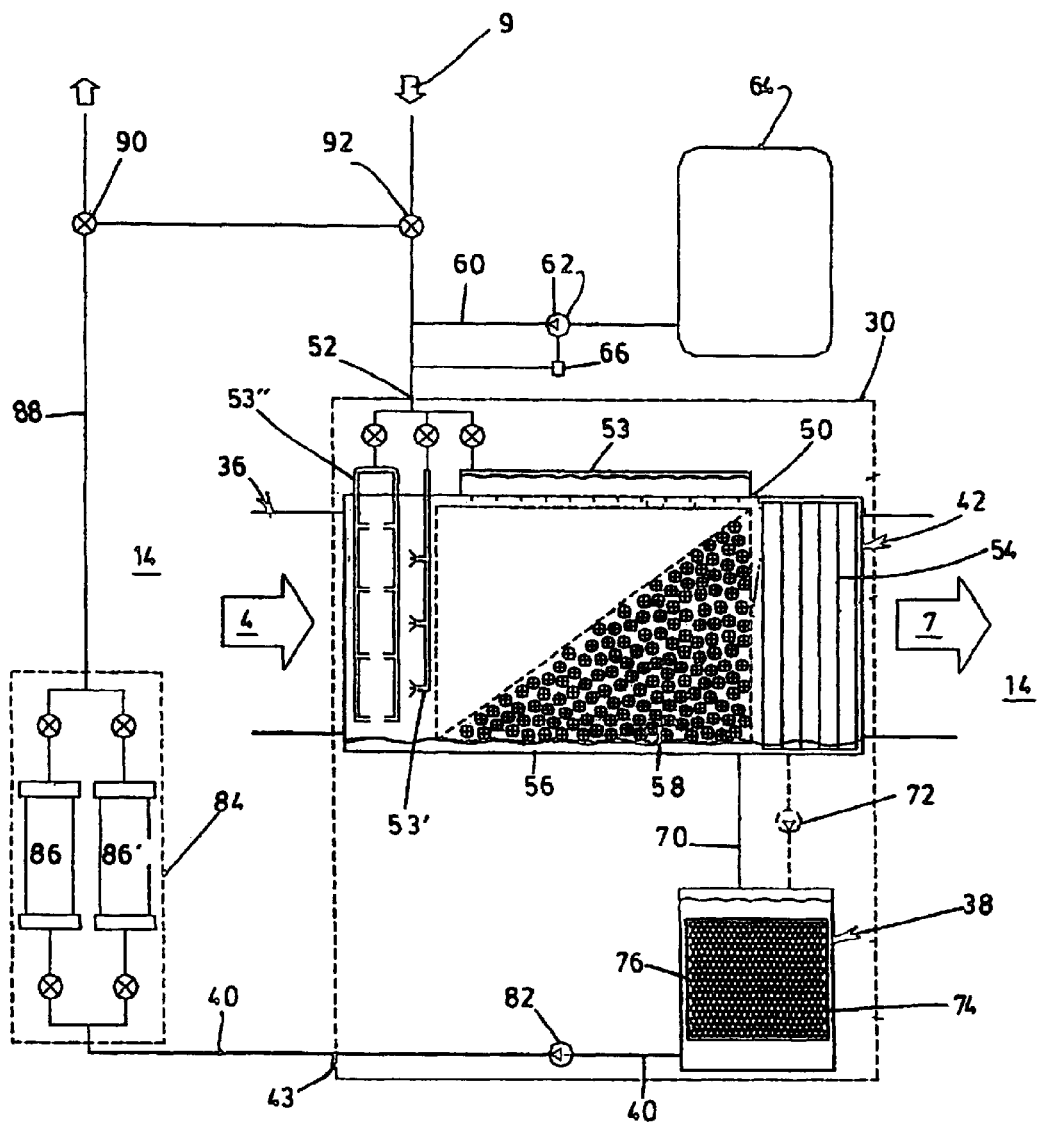
FIG. 2 is a schematic view of one version of a bioreactor of a ventilation system according to a first preferred embodiment of the invention using an enzyme in indirect contact with the gas flow.
Figure 3:
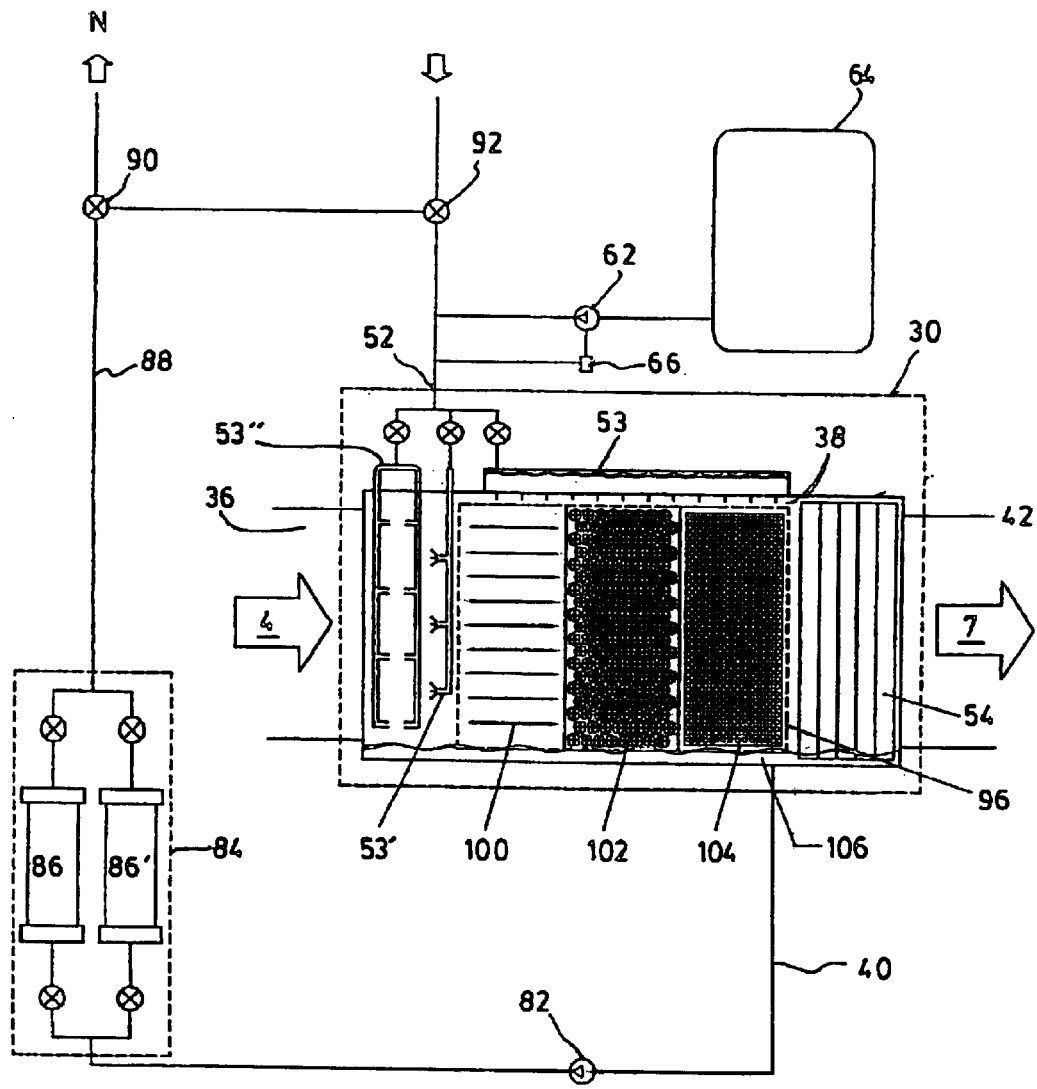
FIG. 3 is a schematic view of a second version of a bioreactor of a ventilation system according to a second preferred embodiment of the invention using an enzyme in direct contact with the gas flow.

The ventilation system (10) further comprises a bioreactor (30) including an enzymatic reaction chamber (38), best shown in FIGS. 2 and 3, adapted to catalyse hydration of carbon dioxide contained in at least a portion of the stale air into a solution of carbonate ions and hydrogen ions, and thereby removing carbon dioxide from said portion of the stale air (4) and obtaining clean air (7). As shown, the bioreactor (30) is located in the second ducting system (14) upstream from the second vent (22).

The ventilation system (10) further comprises evacuating means, preferably a pipe (24) having an inlet connected to a liquid outlet of the bioreactor (30) and an outlet (26) located outside the ventilation system, for evacuating the solution of carbonate ions and hydrogen ions out of the ventilation system (10). Although only one pipe (24) is shown in FIG. 1, it is to be understood that each bioreactor (30) shown in this Figure is provided with an evacuating means.

Whatever be the illustrated preferred embodiments, the bioreactor (30) according to the invention is introduced into existing ventilation systems (10) downstream from the inlet (16) of the second ducting system (14).

As shown in FIG. 1, two possible locations are suggested for the installation of a bioreactor (30). The first location, in the recirculation duct (32), also called return duct, makes it possible to treat exclusively the flow of air, which is mixed with the fresh air (2) from the exterior. The second location, located upstream of the exhaust fan (34) makes it possible to treat all the produced CO$_2$. Since the airflow in this place is high, the bioreactor (30) can be accordingly sized. In order to avoid manufacturing a bioreactor (30) of disproportionate size, it is possible to install several small bioreactors (30'), to treat weaker air flows located upstream from the return plenum.

Referring now to either FIG. 2 or 3, the bioreactor (30) comprises air inlet means (36), for example a wire or plastic netting with large enough meshes or any other suitable inlet means known in the art, for receiving at least a portion of the stale air (4) flowing in the second duct (14). The stale air (4) comprises air and carbon dioxide. The bioreactor (30) further comprises dissolving means for dissolving the carbon dioxide contained in the stale air (4) into an aqueous liquid. The dissolving means will be described herein below in reference to the two preferred embodiments shown in FIGS. 2 and 3.

The bioreactor (30) also comprises an enzymatic reaction chamber (38) filled with carbonic anhydrase or an analogue thereof to catalyse the hydration of the dissolved CO$_2$ into the solution (40) of bicarbonate ions and hydrogen ions mentioned above. The bioreactor (30) further comprises a liquid outlet (43) in fluid communication with the enzymatic reaction chamber (38) for discharging said solution out from the bioreactor (30). The bioreactor (30) further comprises an air outlet unit (42) for exhausting clean air out (7) from the bioreactor (30) into the second duct system. (14)

The present invention can be used in two different forms. In the first form, the enzyme and its support contained in the enzymatic reaction chamber (38), are submerged in a solvent and are not in contact with the gas flow (FIG. 2). In the second form, the enzyme is immobilised on a support which can be introduced directly into the second duct system (14) and thus, have direct contact with gas flow and be non-submerged (FIG. 3).

A more detailed description of these two preferred embodiments shown respectively in FIGS. 2 and 3 will now be given First Preferred Embodiment: Submerged Enzyme, Indirect Gas Contact As shown in FIG. 2, the bioreactor (30) comprises two parts, namely a dissolution chamber or module (50) and an enzymatic treatment module, which is the enzymatic reaction, chamber (38) mentioned herein above. More particularly, in this first preferred embodiment, the dissolving means comprises a liquid inlet (52) located in a top portion of the bioreactor (30) for receiving an aqueous liquid (9) and a dissolution chamber (50) located between the air inlet unit (36) and the air outlet unit (42), and over the enzymatic reaction chamber (38). As apparent from FIG. 2, the dissolution chamber (50) is indirect fluid communication with the air inlet (36) and the air outlet (42) whereby the stale air (4) is allowed to flow across the dissolution chamber (50).

The stale air (4) containing CO$_2$ circulates in the ventilation system (10) and enters the dissolution module (50) where the CO$_2$ gas dissolves into the aqueous liquid (9). Dissolving of the CO$_2$ gas is necessary since carbonic anhydrase acts only on CO$_2$ found in aqueous phase. The aqueous liquid (9) is introduced into the dissolution module (50) preferably by means of an aspersion system (53, 53', 53"), which aims to maximise the exchange surface between the liquid phase and the gas phase. The aspersion system preferably comprises at least one sprinkler (53) in a top portion of the dissolution chamber (50) and in fluid communication with the liquid inlet (52) of the bioreactor (30) to sprinkle aqueous liquid onto the stale air (4) flowing across the dissolution chamber (50) and thus to dissolve the CO$_2$ contained therein.

In doing so, an optimal quantity of CO$_2$ is dissolved in an aqueous liquid to allow for a chemical conversion. The droplets, charged with aqueous CO$_2$, then fall towards the bottom (51) of the dissolution module (50), however a certain quantity of solvent might be carried by the gas flow. In order to avoid losing a significant quantity of solvent in the ventilation system (10), an inertial separator (54) is used to recover the unused droplets. The inertial separator (54) preferably comprises a series of baffle walls extending in a direction transversal to the flowing direction of the gas to force the clean air to zigzag out from the bioreactor (54). This phenomenon occurs due to a series of obstacles that arise because of the liquid high inertia in comparison to the gas particles. The droplets striking against the walls form beads and are trapped by a water recipient (56) located at the bottom of the dissolution module (50).

Dissolution of CO$_2$ in the solvent is a key aspect in the treatment. To improve dissolution, it is preferable to add an inert packing material (58) in the centre section of the dissolution module (50). The packing material (58) increases the exchange surface between the liquid-gas interface and also augments the residence time of the solvent in the dissolution module (50). However, obstruction created by the packing material (58) can also increase the pressure loss in the module (50). The choice of packing material (58) is made according to the process. Complex structures, such as Tri-Pak™, made out of polymers and grids of filament are possible choices of packing materials suitable for the invention. However any other packing material could be used without departing from the scope of the present invention.

Another method to improve the dissolution of CO$_2$ in a solvent consists of adding additives like an amine or a base to the solvent. TRIS, Tris(hydroxymethyl)aminomethane, and NaOH are two interesting alternatives that are preferably used to ensure better dissolution. To prepare the solvent, water (9) coming from the aqueduct system (fresh water inlet) is mixed with a small quantity of sodium hydroxide (60) injected with by means of a pump (62) and supplied by the tank (64). A regulation system (66) makes it possible to control the content of NaOH in the solvent as to preserves its properties of dissolution.

The aqueous solvent containing aqueous CO$_2$ is conveyed by gravity (70) or by means of a pump (72) into the enzymatic treatment module (38). The enzymatic treatment module (38) preferably comprises a cartridge (74) containing the carbonic anhydrase immobilised on a polymer support (76) such as nylon, polypropylene, polyethylene, polystyrene, Teflon, etc. In the presence of the enzyme, the following hydration reaction is carried out:

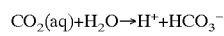

$$CO_2(aq)+H_2O \rightarrow H^+ + HCO_3^-$$

The product of the natural reaction without use of the enzyme is much slower in comparison to the reaction above since it must go through an intermediary step. The intermediary step consists of the formation of carbonic acid (H$_2$CO$_3$) before producing hydrogen carbonate ion (HCO$_3^-$).

Thereafter, the carbonate ions are preferably withdrawn from the solution (40) of hydrogen ions and carbonate ions.

This is done by transferring, preferably with the help of a pump (82), the solution (80) to a resin ion exchanger (84). This resin (84) is in the form of two parallel cartridges (86,86') whose operating mode would alternate between adsorption and regeneration. By means of an appropriate valve (90), the filtered solvent (88) can be either drained and/or reintroduced in the bioreactor (30) in a certain proportion in order to continue the operation of the system. By means of valve (92), the drained quantity is replaced by fresh water.

The aspersion system also preferably comprises splashing means (53', 53') upstream from the dissolution chamber (50) and in fluid communication with the liquid inlet (52) of the bioreactor (50) for splashing an aqueous liquid on the portion of stale air (4) prior it enters the dissolution chamber (50).

Second Preferred Embodiment: Non-submerged Enzyme, Direct Gas Contact

Referring to FIG. 3, in a second preferred embodiment, the enzymatic reaction chamber (38) is located in between the air inlet (36) and the air outlet (42) of the bioreactor (30) and is in direct fluid communication with the same whereby the stale air (4) is allowed to flow across the enzymatic reaction chamber (38). In this case, the dissolving means which is integrated into the enzymatic reaction chamber (38) comprises the liquid inlet (52) of the bioreactor (30) and a sprinkler (23), that may comprise a plurality of nozzles, in a top portion of the enzymatic reaction chamber (38). The sprinkler (23) may also simply be a perforated ceiling of the bioreactor (30). The sprinkler (23) is in fluid communication with the liquid inlet (52) of the bioreactor (30) to sprinkle aqueous liquid (9) onto the stale air (4) flowing across the enzymatic reaction chamber (38) and, thus, dissolved the $CO_2$ contained therein.

In other words, in this preferred embodiment, the active element, the enzyme, is integrated to the dissolution module described above. In this form, the two modules (38 and 50) described in reference to the first preferred embodiment are now combined into one treatment module (38) where dissolution of $CO_2$ and enzymatic transformation occur.

The gas phase, that is to say the stale air (4), penetrates the interior of the bioreactor (30) and encounters an activated support (96) on which the enzyme is immobilised. The aqueous solvent (9) of identical composition to the first preferred embodiment is projected on the activated support (96) by means of the sprinkler (26) so that the enzyme is not dried during passage of the air. To enhance dissolution of $CO_2$, this embodiment like the first embodiment described above preferably comprises splashing means (53', 53") located upstream the enzymatic reaction chamber (38) for splashing aqueous liquid on the stale air prior (4) it enters the enzymatic reaction chamber (38).

The support (96), on which the carbonic anhydrase is immobilised, is preferably made up of polymers such as nylon, polypropylene, polyethylene, polystyrene, Teflon, etc.

In addition to the produced droplets, the water film which covers the support (96) makes it possible to dissolve a significant quantity of $CO_2$ in water by increasing the surface contact between the liquid phase and the gas phase. The choice of the geometrical support determines the performance level of the system as well as the pressure loss. The activated support (96) is preferably installed in an interchangeable cartridge and can take the form of plates (100), Tri-Pak™ (102), netting of mesh (104), etc. It is worth noting that although these three activated supports are shown in FIG. 3, it is possible to use only one or two of these at a time.

The enzymatic transformation is carried out directly by mixing the aqueous solvent and $CO_2$ on the activated support (96) to produce the $HCO_3^-$ ions that are carried by solvent into a water recipient (106) located at the bottom of the bioreactor (30). As in the first preferred embodiment, the droplets carried by the airflow are intercepted by an inertial separator (54). The clean air exempt of $CO_2$ then continues its course in the ventilation system (10).

The solution (40) containing the ions is conveyed to the resin ion exchanger (84) by means of a pump (82). The released solvent is ready to be re-circulated.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

For example, the geometry of the active polymeric support can be varied; the material used as enzyme support can also be varied: plastic, metal, ceramic, glass, etc.; the solvent sprinkling system can vary; FIGS. 2 and 3 representing three potential systems: a perforated ceiling, opposite nozzles, and counter-current nozzles; the separator can be different.

What is claimed is:

1. A ventilation system for an enclosure in which people live, comprising:

a first ducting means for ducting fresh air from outside to inside the enclosure;

a second ducting means for ducting stale air, comprising a stale air inlet for receiving stale air containing carbon dioxide from inside the enclosure and an exhaust manifold having a first vent to exhaust air outside the enclosure and a second vent in fluid communication with the first ducting means to return clean air into the first ducting means;

catalysing means for catalysing hydration of carbon dioxide contained in at least a portion of the stale air into a solution of carbonate ions and hydrogen ions, and thereby removing carbon dioxide from said portion of the stale air and obtaining clean air; the catalysing means being located in the second ducting means upstream from said second vent, said catalysing means comprising a bioreactor comprising air inlet means for receiving said at least a portion of the stale air; dissolving means for dissolving the carbon dioxide contained in said at least a portion of the stale air into an aqueous liquid; an enzymatic reaction chamber filled with carbonic anhydrase or an analog thereof to catalyse the hydration of said dissolved $CO_2$ into said solution bicarbonate ions and hydrogen ions; a liquid outlet in fluid communication with the enzymatic reaction chamber for discharging said solution of bicarbonate ions and hydrogen ions out from the bioreactor; and air outlet means for exhausting clean air out from the bioreactor into the second ducting means; and wherein the dissolving means comprises a liquid inlet located in a top portion of the bioreactor for receiving an aqueous liquid; a dissolution chamber located between the air inlet means and air outlet means, and over the enzymatic reaction chamber, the dissolution chamber being in fluid communication with the air inlet means and the air outlet means whereby said at least a portion of stale air is allowed to flow across the dissolution chamber; and a liquid outlet in a bottom portion of the dissolution chamber and in fluid communication with the enzymatic reaction chamber whereby an aqueous liquid containing $CO_2$ is supplied to a liquid inlet of the enzymatic reaction chamber, the liquid outlet of the dissolution chamber is at a predetermined distance from the liquid inlet of the enzymatic reaction chamber chosen so as to prevent the dissolved carbon dioxide contained in said aqueous liquid to return to a gaseous phase; and evacuating means for evacuating said solution out of the ventilation system.

2. A ventilation system as claimed in claim 1, wherein the catalysing means comprises an enzyme capable of catalysing said hydration of carbon dioxide.

3. A ventilation system as claimed in claim 2, wherein said enzyme is carbonic anhydrase or an analog thereof.

4. A ventilation system as claimed in claim 1, wherein the bioreactor comprises an upstream side opposite a downstream side, the air inlet means being located on the upstream side and the air outlet means being located on the downstream side whereby the air inside the bioreactor is flowing from the upstream side towards the downstream side along a flowing direction.

5. A ventilation system as claimed in claim 4, wherein the air outlet means comprises:

separating means for separating any liquid in suspension from the clean air.

6. A ventilating system as claimed in claim 5, wherein the separating means comprises a series of baffle walls extending in a direction transversal to said flowing direction to force the clean air to zigzag out from the bioreactor.

7. A ventilation system as claimed in claim 1, wherein the enzyme filling the enzymatic reaction chamber is submerged.

8. A ventilation system as claimed in claim 1, further including a sprinkler in fluid communication with the liquid inlet of the bioreactor to sprinkle aqueous.

9. A ventilation system as claimed in claim 8, wherein the sprinkler is located on in a top portion of the dissolution chamber.

10. A ventilation system as claimed in claim 8, wherein the sprinkler is located upstream from the dissolution chamber and in fluid communication with the liquid inlet of the bioreactor for sprinkling an aqueous liquid on said at least a portion of stale air prior it enters the dissolution chamber.

11. A ventilation system as claimed in claim 1, wherein the dissolution chamber is filled with packing to enhance the dissolution of the carbon dioxide.

12. A ventilating system as claimed in claim 1, wherein the evacuating means comprises:

a pipe having an inlet connected to the liquid outlet of the bioreactor and an outlet located outside the ventilation system.

13. A ventilation system as claimed in claim 1, wherein the catalysing means is located upstream from the exhaust manifold.

14. A ventilation system as claimed in claim 1, wherein the stale air inlet comprises a plurality of inlet ducts, and wherein the catalysing means is located inside each of said inlet ducts.

15. A ventilation system as claimed in claim 1, wherein the exhaust manifold comprises a return duct, said second vent of the exhaust manifold being located at an end of said return duct; and wherein the catalysing means is located inside the return duct. liquid onto the stale air flowing across the dissolution chamber and dissolved the $CO_2$ contained therein.

* * * * *